United States Patent [19]

Rossigno et al.

[11] Patent Number: 5,118,164
[45] Date of Patent: Jun. 2, 1992

[54] ADAPTIVE BRAKING SYSTEM DEFAULT ACTIVATED PROPORTIONING VALVE

[75] Inventors: Louis P. Rossigno, Granger, Ind.; Robert F. Gaiser, Stevensville, Mich.; Robert B. Temple, Granger, Ind.

[73] Assignee: Allied-Signal Inc., Morristown, N.J.

[21] Appl. No.: 620,163

[22] Filed: Nov. 30, 1990

Related U.S. Application Data

[62] Division of Ser. No. 414,810, Sep. 29, 1989, Pat. No. 4,982,999.

[51] Int. Cl.⁵ .................... B60T 8/26; F16K 17/14
[52] U.S. Cl. .................... 303/9.63; 303/92; 137/72; 137/73
[58] Field of Search .......... 137/599, 72, 73; 303/9.62, 9.63, 9.75, 9.76, 92, 113, 113 AP, 111

[56] References Cited

U.S. PATENT DOCUMENTS

| | | |
|---|---|---|
| 2,620,815 | 12/1952 | Margraf et al. ............ 137/70 |
| 3,576,350 | 4/1971 | Larson ............ 303/115 X |
| 3,848,932 | 11/1974 | Lewis ............ 303/9.63 |
| 3,863,720 | 2/1975 | Young ............ 137/73 X |
| 4,164,953 | 8/1979 | Naab et al. ............ 137/72 |
| 4,626,038 | 12/1986 | Hayashi et al. ............ 303/113 AP X |
| 4,659,150 | 4/1987 | Kubota et al. ............ 303/9.62 |
| 4,982,999 | 1/1991 | Rossigno et al. ............ 303/9.63 |

FOREIGN PATENT DOCUMENTS

| | | |
|---|---|---|
| 2815119 | 10/1978 | Fed. Rep. of Germany ........ 137/72 |
| 3410083 | 10/1984 | Fed. Rep. of Germany . |
| 3419311 | 11/1985 | Fed. Rep. of Germany . |
| 3742364 | 6/1989 | Fed. Rep. of Germany . |
| 1214234 | 4/1960 | France . |
| 2624462 | 6/1989 | France . |

Primary Examiner—Robert J. Oberleitner
Assistant Examiner—Alfred Muratori
Attorney, Agent, or Firm—Larry J. Palguta; Ken C. Decker

[57] ABSTRACT

The adaptive braking system (10) default activated proportioning valve (80, 80A, 80B) comprises a proportioning valve that is deactivated during normal and adaptive braking system operation. Should the adaptive braking system (10) experience a failure so that the related wheel or wheels (49, 59) of the vehicle no longer receive an appropriate braking pressure from a pressure producing mechanism (12) of the vehicle, the proportioning valve (80, 80A, 80B) is activated by the electronic control unit (70) of the adaptive braking system (10) so that the braking pressure is proportioned accordingly. The valve contains a fusible link that is disipated to allow the valve to proportion.

5 Claims, 2 Drawing Sheets

FIG. I

ADAPTIVE BRAKING SYSTEM DEFAULT ACTIVATED PROPORTIONING VALVE

This is a divisional of co-pending U.S. application Ser. No. 07/414,810 filed on Sep. 29, 1989, now U.S. Pat. No. 4,982,999.

The adaptive braking system default activated proportioning valve of the present invention is utilized in an adaptive braking system, and particularly for activation upon a failure in the adaptive braking system.

BACKGROUND OF THE INVENTION

Many adaptive braking systems have been proposed for and utilized on vehicles. Some adaptive braking systems include one or more proportioning valves which function in conjunction with the adaptive braking system. Some adaptive braking systems eliminate the need for a proportioning valve. However, should the adaptive braking system fail for any number or variety of reasons, it is highly desirable to have a proportioning valve operating within the braking system so that the rear wheels of the vehicle are prevented from premature lockup during braking of the vehicle, and in the manner in which proportioning valves have been used for many years on vehicles. The present invention provides a solution to the above problem by providing a proportioning valve which is normally inoperative during normal braking and anti-skid braking. However, should the adaptive braking system experience a failure, the proportioning valve is activated and proportions fluid pressure communicated to the rear wheels of the vehicle.

SUMMARY OF THE INVENTION

The present invention comprises an adaptive braking system for a vehicle, the system including proportioning valve means for proportioning fluid pressure communicated between fluid pressure producing means and at least one wheel brake of the vehicle, the proportioning valve means normally deactivated so that fluid pressure is transmitted therethrough without being proportioned by the proportioning valve means, the proportioning valve means being operatively connected with control means of the system, the control means responsive to a failure in the adaptive braking system so as to activate the proportioning valve means such that fluid pressure communicated to said wheel brake is proportioned during said failure.

BRIEF DESCRIPTION OF THE DRAWINGS

The invention is described in detail below with reference to the drawings which illustrate embodiments in which.

DETAILED DESCRIPTION OF THE INVENTION

Figure 1:
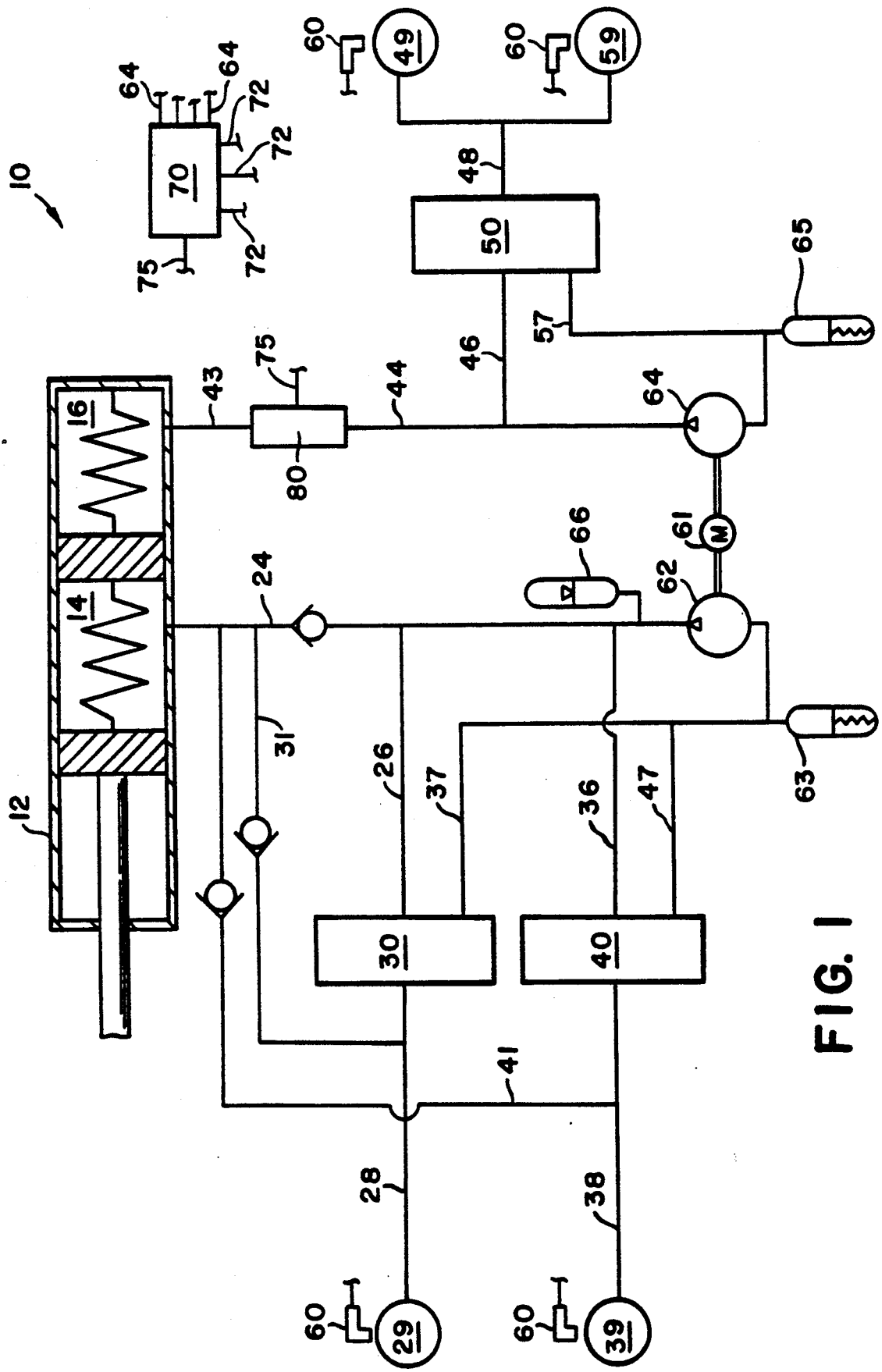
FIG. 1 is a schematic representation of a typical adaptive braking system having the present invention therein.

FIG. 1 is a schematic illustration of a typical adaptive braking system 10. System 10 includes a pressure producing mechanism such as a master cylinder or full power hydraulic booster 12 which includes a pair of chambers 14 and 16 that communicate with hydraulic circuits of the system. Chamber 14 communicates with brake line 24 which transmits fluid pressure to brake lines 26 and 28. Brake lines 26 and 28 are connected with electrovalve means 30 which may comprise any one of or a number of valves which effect any of the typical isolate, build and decay functions of an adaptive braking system. Brake line 28 communicates with one of the front wheels 29 and also with a bypass line 31 which enables fluid to return to chamber 14 during release of the brakes. Line 24 also communicates with brake line 36, electrovalve means 40, brake line 38, and the other front wheel 39. Line 38 and electrovalve means 40 also communicate with the return line 41 which provides the same function as line 31 during release braking. Adaptive braking system 10 is a schematic representation of a typical pump-back system wherein a pump 61 provides, during adaptive braking, fluid pressure via section 62 and 64 for the electrovalves 30, 40, and 50. Chamber 16 of device 12 communicates through brake line 44 with brake line 46, electrovalve means 50, brake line 48 and the rear wheels 49, 59. Electrovalve means 50 provides for the isolation, build and decay functions in the same manner that electrovalves 30 and 40 operate for their respective circuits. Each of the electrovalves 30, 40, and 50 includes a respective return or decay line 37, 47, 57 which communicates with a respective pumping section. Sumps 63 and 65 communicate with brake lines 37, 47, and 57. An accumulator 66 provides pressure as needed in the two front wheel brake circuits. The wheels 29, 39, 49, and 59 include speed sensors 60 which communicate with a control means or ECU 70 via lines 64. Control means 70 provides communication via lines 72 with the respective electrovalve means 30, 40, and 50. Control means 70 communicates via line 75 with proportioning valve means 80. Proportioning valve means 80 is disposed within brake line 44 so that it communicates directly with chamber 16 of pressure producing device 12. It should be clearly understood that the adaptive braking system 10 illustrated herein could be any one of a multitude of adaptive braking systems, which include any type of pressure producing devices, electromagnetic valves, check valves, speed sensors, and so on. The present invention may be utilized in literally any type of adaptive braking system, and may be positioned in the brake line which communicates directly with a chamber of the pressure producing device or may be positioned in brake line 48 so that it communicates directly with at least one of the wheels of the vehicle. The exact positioning of the proportioning valve means can be determined according to the various parameters and requirements of the adaptive braking system.

Proportioning valve means 80 is a normally deactivated proportioning valve which does not affect fluid communication being transmitted from chamber 16 of device 12 to the respective brake line circuit and wheel brake(s). Adaptive braking system 10 provides for the appropriate control of braking pressure to the rear wheels 49, 59 in case of an impending or incipient skidding condition. Therefore, as long as the adaptive braking system is able to operate as needed, the presence of an operative proportioning valve in the system is not required. However, the adaptive braking system may experience a failure in whole or part for any number of reasons, including electrical circuit failure, ECU failure, and so on. Upon the occurrence of a failure in the adaptive braking system, whether this occurs during normal braking or adaptive braking system operation, or when no braking is being effected at all, a default signal will be sent by the ECU via line 75 to proportioning valve means 80 to effect activation of the proportioning valve means. Thus, fluid pressure transmitted from device 12 to at least one of the wheels of the vehicle, and in most cases both of the rear wheels, will be proportioned in the same manner as normally occurs in vehicles that do not have adaptive braking systems. This will prevent a premature lockup or sliding of the wheels during braking as the front of the vehicle moves downwardly and the rear end of the vehicle rises during which there is less traction between the rear wheels and road surface.

Figure 2:
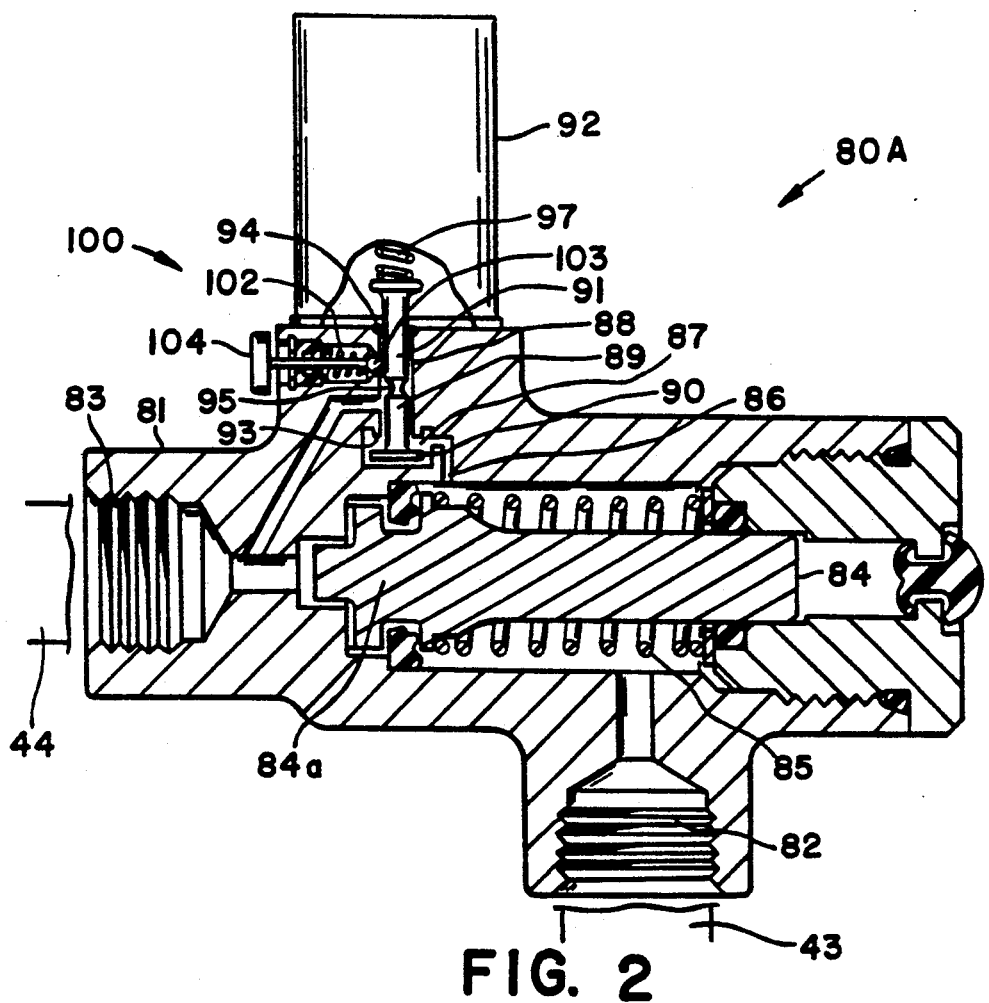
FIG. 2 is a section view of a first embodiment of the default activated proportioning valve of the present invention.

FIG. 2 illustrates a first embodiment of a proportioning valve in accordance with the present invention. Proportioning valve 80A comprises a body 81 which transmits fluid pressure via line 43 and opening 82 to opening 83 and line 44. A differential area piston 84 biased by spring 85 would normally operate in response to the fluid pressure to effect proportioning thereof. However, a bypass line 86 permits fluid to bypass around differential area piston 84 and be communicated directly to opening 83 and line 44. Thus, piston 84 does not experience a fully operational pressure differential thereacross and remains inoperative. Bypass 86 includes a chamber 87 and channel 88 which receives valving means 89. Valving means 89 includes a valve seat 93 positioned adjacent valve head 90 of valve shaft 91. Valve shaft 91 extends into and is a part of a solenoid means 92, shaft 91 being biased by spring means 97. An appropriate sealing mechanism 94 is disposed about shaft 91. Shaft 91 includes a recessed area 95 disposed in channel 88. A resettable detent mechanism 100 includes a spring 102 biased head 103 which may be received within recessed area 95. A reset member 104 is disposed exteriorly so that it may be accessed and moved radially outwardly such that head 103 is moved out of engagement with recess 95.

When adaptive braking system 10 experiences a failure which would prevent operation of part or all thereof, control means 70 sends a signal via connection 75 to solenoid 92 which is activated thereby. Solenoid 92 causes shaft 91 to be retracted against spring 97 a distance sufficient to align recess 95 with head 103. Head 103 is biased by spring 102 and enters into recess 95 as soon as the two are aligned. This will retain shaft 91 in a retracted position without the solenoid having to be continually energized. Retraction of shaft 91 moves valve head 90 into engagement with seat 93 so that bypass 86 is closed. The closing of bypass 86 now causes fluid pressure received at opening 82 to be communicated only around the head 84a of differential piston 84 and to opening 83 and brake line 44. Piston 84 will experience a pressure differential thereacross and move laterally in order to proportion braking fluid pressure appropriately. When the adaptive braking system has been repaired so that it will operate appropriately, the resettable detent mechanism may be reset by pulling reset member 104 radially outwardly to retract head 103 and allow the spring biased shaft 91 and valve head 90 to move downwardly so that valve seat 93 is opened and bypass 86 is reopened. This will place proportioning valve means 80A in an inoperative mode.

Figure 3:
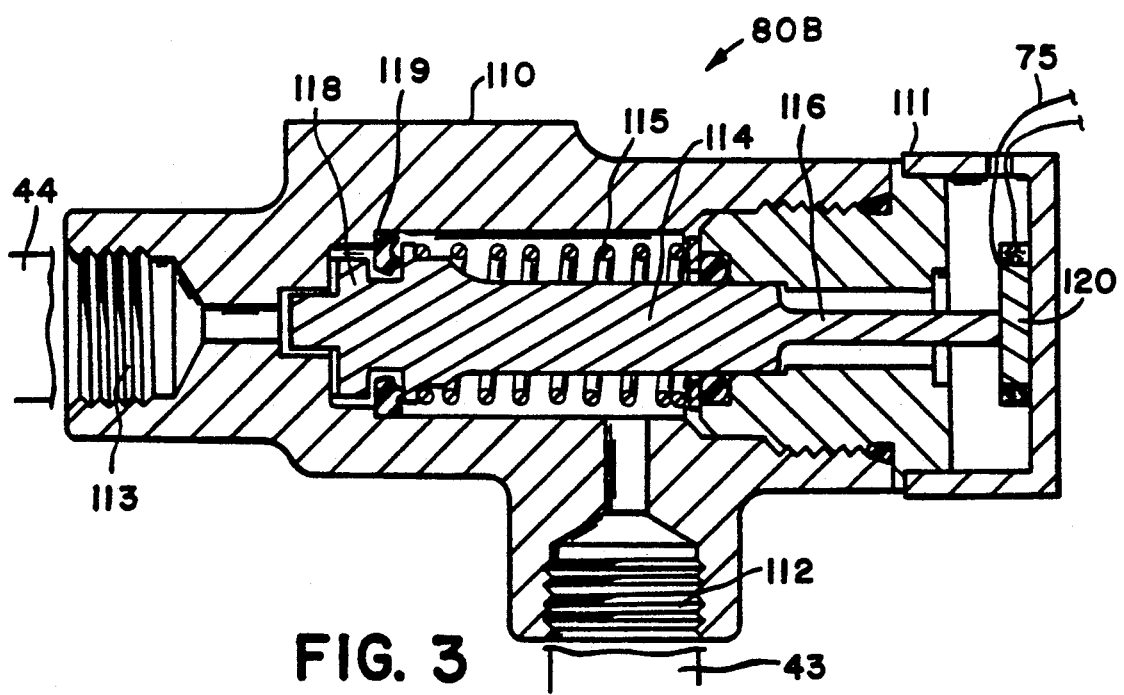
FIG. 3 is a second embodiment of the default activated proportioning valve of the present invention.

FIG. 3 illustrates a second embodiment of the proportioning valve of the present invention. Proportioning valve means 80B comprises a body 110 which includes an opening 112 that communicates with brake line 43, and an opening 113 which communicates with brake line 44. The differential area piston 114 is biased by a spring 115 and includes an extension member 116. Body 110 includes a threaded end cap 111 which carries a fusible link 120. Fusible link 120 communicates operatively with the ECU via connection 75. Extension 116 abuts the fusible link so that piston 114 is held to the left such that head portion 118 does not engage seal 119. This places piston 114 in an inoperative position so that fluid may flow freely between openings 112 and 113. Should the adaptive braking system experience a failure, a signal is sent via connection 75 to fusible link 120 which will, over a short period of time, dissipate. Fusible link 120 need not dissipate immediately, but it is preferable that it dissipate over a short period of time so that intermittent or short term interruptions in the ECU electrical system will not cause the fusible link to dissipate prematurely. When fusible link 120 has dissipated, piston 114 may move laterally in response to a pressure differential thereacross and effect the proportioning of fluid pressure.

Vehicles which include adaptive braking systems typically operate to maintain brake balance under various road conditions. Upon failure of the adaptive braking system to operate regularly, brake balance can be jeopardized and the vehicle can become unstable if the rear wheels should lock before the front wheels. The present invention provides a solution to this problem by activating proportioning valve means which will decrease pressure to the rear wheels during the period that the adaptive braking system is inoperative. This will reduce the likelihood of the rear wheels locking.

We claim:

1. A proportioning valve that may be activated upon receipt of a command, the valve comprising a body having piston means and mechanical retention means which retains the piston means in an inoperative position, the command causing the retention means to release the piston means to operate responsively to fluid pressure in the body, the retention means including a fusible link that dissipates upon receipt of the command, and the retention means including the piston means extending into engagement with the link by means of an extension which abuts the link to effect the inoperative position whereby fluid flows around the piston means without effecting piston means movement which normally proportions the fluid flow.

2. The valve in accordance with claim 1, wherein the extension is integral with said piston means.

3. The valve in accordance with claim 1, wherein the valve includes a threaded end cap which contains said fusible link.

4. The valve in accordance with claim 1, wherein the command is transmitted by an electronic control unit.

5. The valve in accordance with claim 1, further comprising resilient means disposed about said piston means, the extension extending from a portion of the piston means, and the resilient means disposed between an enlarged diameter area of said piston means and a part of said piston means which is spaced apart from said portion.

* * * * *